W. A. SCHMIDT.
ART OF SEPARATING SUSPENDED PARTICLES FROM GASES.
APPLICATION FILED AUG. 27, 1917.

1,339,480.

Patented May 11, 1920.

Inventor:
Walter August Schmidt
by Arthur P. Knight
Attorney.

W. A. SCHMIDT.
ART OF SEPARATING SUSPENDED PARTICLES FROM GASES.
APPLICATION FILED AUG. 27, 1917.
1,339,480.
Patented May 11, 1920.
2 SHEETS—SHEET 2.
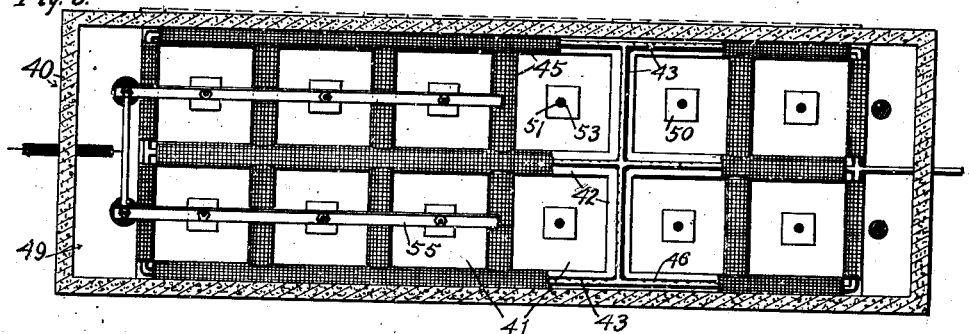
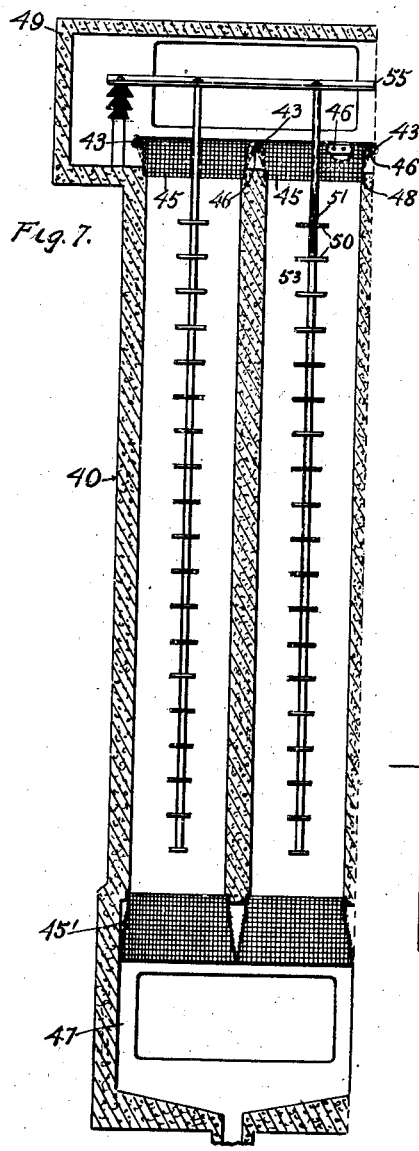
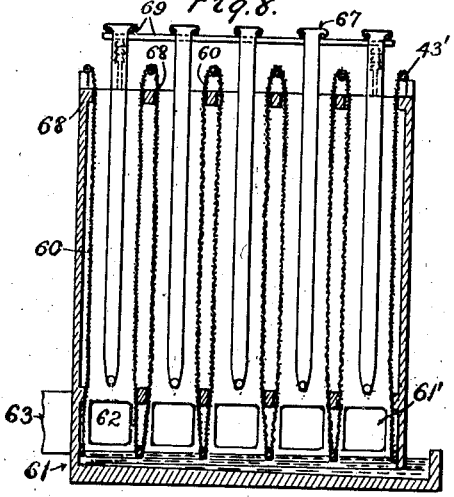
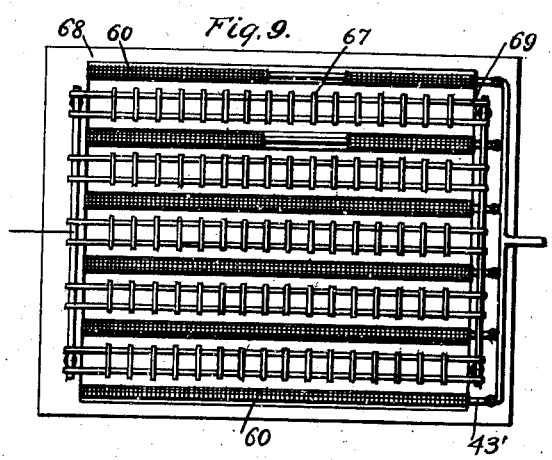
Inventor:
Walter August Schmidt
by Arthur P. Knight
Attorney

UNITED STATES PATENT OFFICE.

WALTER AUGUST SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

ART OF SEPARATING SUSPENDED PARTICLES FROM GASES.

1,339,480.  Specification of Letters Patent.  Patented May 11, 1920.

Application filed August 27, 1917. Serial No. 188,453.

*To all whom it may concern:*

Be it known that I, WALTER AUGUST SCHMIDT, a citizen of the United States, residing at Los Angeles, in the county of Los Angeles and State of California, have invented a new and useful Improvement in the Art of Separating Suspended Particles from Gases, of which the following is a specification.

This invention relates to separation of dust or fume from gases by subjecting such gases to the action of an electrical field maintained between electrodes, in such manner that the dust or fume particles are caused to precipitate on certain of said electrodes. It has been found desirable, in some cases, to apply a liquid such as water, or solution, to the surfaces of the electrodes on which the dust or fume is so precipitated, in order to provide, in effect, a liquid electrode surface which is continually renewed and is always in uniform smooth and clean condition. By washing the electrodes in this manner, it is possible to eliminate the expense of construction and operation of mechanical cleaning means (hammer or knocking means); to avoid the frequent shut downs required for operation of such cleaning means; and to operate with more uniformly effective electrical conditions, by eliminating the disturbing effects on the electrical operation which would in some cases, be caused by the presence of dry deposited material on the electrodes, such deposits having the effect in some cases, of causing undesirable electrical actions leading to reduction in the potential difference or in the current, that can be maintained in the apparatus, with corresponding reduction in the efficiency of precipitation. The use of a liquid stream on the electrodes may also be of advantage in effecting solution of a constituent or constituents of the fume or dust being precipitated.

The main object of the present invention is to provide for maintaining a liquid electrode surface, for the purposes above stated, in the most effective and economical manner. Another object of this invention is to maintain such liquid electrode surface in such manner that a minimum amount of liquid may be used.

A further object of the invention is to provide, in an electrical precipitator, improved means for producing the discharge of electricity into the gases, required for the precipitating action.

The accompanying drawings illustrate apparatus embodying my invention, and referring thereto:

Fig. 6 is a horizontal section of another form of the invention.

Fig. 7 is a vertical section thereof.

Fig. 8 is a vertical section, and

Figure 1:
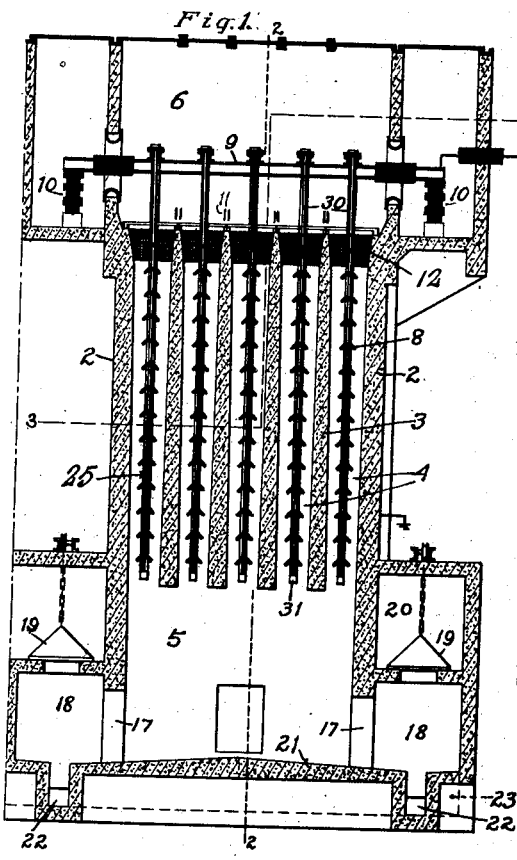
Figure 1 is a vertical section of one form of such apparatus, taken on line 1—1 in Fig. 2.

Fig. 9, a partly broken plan of another modification.

The apparatus shown in Figs. 1 to 5, comprises a structure, built up or formed in such manner as to form vertical side walls 1, end walls 2 and partition walls 3, and to form between said walls, a plurality of vertical chambers or flues 4. Said structure is also formed with a lower header chamber 5, into which all the flues 4 open at their lower ends, and an upper header 6 is also preferably provided. The structure is preferably of reinforced concrete, but it may be of masonry, such as brick, tile or stone, suitably supported, if necessary, by steel framing, or it may be of metal or other material, with suitable lining or facing of cement, plaster, unglazed tiles or other porous, absorbent material for the flues. For example, the flue walls may be formed of wood or expanded metal backing, plastered to form a porous surface.

The walls 1, 2 and 3 of these flues preferably constitute receiving or collecting electrodes for the apparatus, and an important feature of my invention is the construction or surfacing of these electrodes in such manner that a porous, absorbent surface will be presented, to receive and distribute the liquid supplied to the apparatus, as hereinafter described. Where metal, glazed tile or other non-porous materials are used for receiving electrodes to which liquid is supplied, there is a tendency for the liquid to flow in streaks or ridges and to leave parts of the surface unwetted. I have found that a porous, absorbent surface is wettable by the liquid in such manner that the liquid tends to be distributed on and to wet all parts of the surface.

Discharge electrodes 8 are hung in the respective flues 4, said electrodes being of any suitable construction, and being mounted on a top frame 9, which is supported by insulators 10 in the upper header.

A gas supply flue is connected to a conduit 13 for distributing the gas to a number of precipitating elements such as herein shown, said conduit connecting through an opening 14 provided with a damper 15, with a flue 16, leading to the upper header 6. The lower header is connected through openings 17 with an outlet chamber 18, and dampers 19 control efflux of gas from chamber 18 to outlet conduit 20, leading to a stack, for example. Said lower header is preferably formed with an inclined floor 21, for draining the liquid or sludge into the lateral chambers 18, which are provided with water seal outlets or traps 22, for allowing the liquid or sludge to flow into an outlet launder 23.

Means are provided for supplying liquid such as water, or a solution, to the surfaces of the walls 1, 2 and 3, constituting the receiving electrodes, said means consisting for example, of troughs 7 formed at the upper ends of said walls and extending around the flues 4. Liquid is supplied to these troughs through pipes 11, and flows over the rims of said troughs and down the surface of the walls. Said pipes 11 may be connected to any suitable liquid supply means for supplying water or other liquid thereto in uniform regulated manner, preferably in such volume as to always keep the surfaces of the flues wet and maintain a thin uniform layer of liquid thereon, but without excess of liquid above the amount required for that purpose. Distributing members 12 consisting, for example, of wire screen, are provided to receive the overflow from troughs 7 and spread it uniformly over the upper parts of walls 1, 2 and 3, said screen extending close or adjacent to the collecting electrodes at the upper part thereof, so that the electrodes form a backing for the screen and hold the water thereon.

The construction of discharge electrode shown in the drawing has certain advantages in economy of construction and efficiency of operation, said construction comprising a series of horizontal strips or plates 8, arranged one above another and supported in a frame extending in a vertical plane and consisting of vertical beams 25 hung from the top frame 9, and a horizontal bottom rail 27. The lowermost plate 8 may be secured on bottom rail 27, and the other plates 8 rest on spacers 28 formed as sleeves surrounding vertical rods 30, hung from the top frame 9, said rods being held in straight position by weights 31 at their lower ends. The plates or strips 8 may be further held in position by means of notches 32 at their ends engaging a vertical flange or rail 33 on the inner face of each of the vertical beams 25. Said vertical beams 25 may be provided with side plates 34 secured thereto and projecting toward the end walls of the flues 4, so as to operate as discharge electrodes, to cause precipitation of the suspended material in the gas passing between them and said walls. This construction of the discharge electrode has the advantage that it is sufficiently rigid and strong to enable it to be supported at its upper end only and to dispense with any lower supports or bracing means for said electrodes, thereby obviating many difficulties that would arise in connection with the insulation of such lower supports, particularly where a conducting liquid is applied to the receiving electrodes and flows down into the space below the same, as in the construction of precipitator above described. The discharge electrode plates 8 extend horizontally in the direction of their length and are preferably dipped or inclined downwardly and outwardly at each edge thereof toward the opposing collecting electrode to facilitate shedding therefrom any material that may lodge thereon.

The discharge electrode is connected by wire 36 to any suitable source of high potential current, preferably unidirectional, for example, in the manner disclosed in patent to F. G. Cottrell, No. 895,729, dated August 11, 1908. The receiving electrodes are grounded, the water or other conducting liquid thereon furnishing sufficient conductivity for the operation of the apparatus, where the material used in such electrodes for example, concrete, tile, plaster, etc., is not of itself of sufficient conductivity.

In the operation of the above described apparatus, the water, solution or other liquid is supplied to the apparatus through the pipes 11, and runs over the rims of troughs 7, and on to the wire mesh or screen members 12, by which the liquid is caused to distribute uniformly over the upper parts of walls 1, 2 and 3, said wall parts and said distributing members being preferably inclined so as to enable a better distribution. On account of the porous, absorbent and wettable nature of the surfaces of the walls, as above described, the water or other liquid will tend to wet and adhere to the same more uniformly, enabling a comparatively thin layer of liquid to be maintained on said surfaces, and at the same time insure that all parts of the surface will be uniformly supplied with liquid, or substantially so.

The liquid or sludge which runs down on said electrodes drains off into the launder 23, and may be treated for recovery of suspended or dissolved materials, or both, and the residual solution may be supplied to the liquid supply means for the precipitation apparatus, or if desired, fresh liquor may be supplied to the precipitation apparatus, and in that case, such residual liquor may be discarded, or it may be evaporated to dryness for recovery of dissolved constituents.

The form of my invention shown in Figs. 6 and 7 comprises a structure 40 of concrete, masonry or other material formed with a plurality of flues 41, for example, of square cross-section, the partition walls 42 of the said structure in this case, extending in two directions transverse to each other, so as to form a series of rows of said flues. The walls of said flues constitute the collecting or receiving electrodes, the surfaces of said walls being of porous material, as above described. The liquid supply pipes 43 in this case, are shown as leading into deflecting and distributing members 45 formed, for example, of wire screen of mesh bent in inverted V-shape and straddling the respective pipes 43, said pipes having perforations 46 adapted to direct jets of liquid against the inner faces of said screens. The lower edges of said screens may rest on ledges 48 on the walls 42. The structure 40 is provided with upper and lower headers 47 and 49 for conducting the gases to and from the precipitator flues, it being understood that the gases may flow either upwardly or downwardly through said flues.

The discharge electrodes in this form of my invention may be formed of any suitable construction, but preferably consists of horizontal plates 50 supported on a vertical rod 51 extending axially in each flue 41, said plates 50 being spaced apart by sleeves 53. Rods 51 are hung from an insulated frame 55 at the top of the structure, which is connected to a suitable energizing high potential circuit, as above described.

Figure 2:
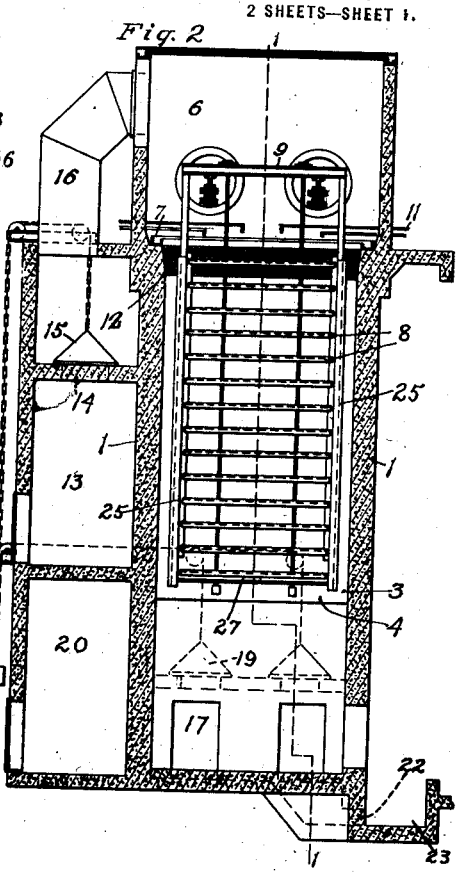
Fig. 2 is a section on line 2—2 in Fig. 1.
Figure 3:
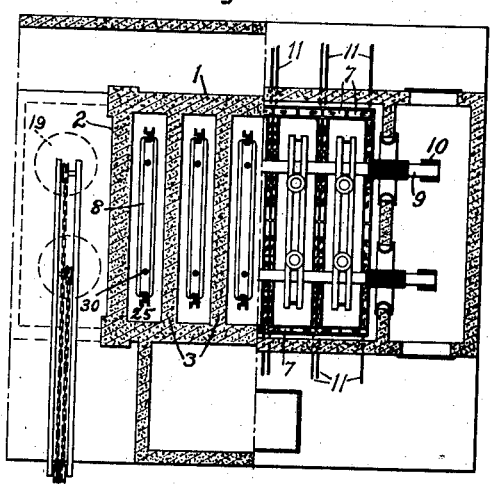
Fig. 3 is a section on line 3—3 in Fig. 1.
Figures 4, 5:
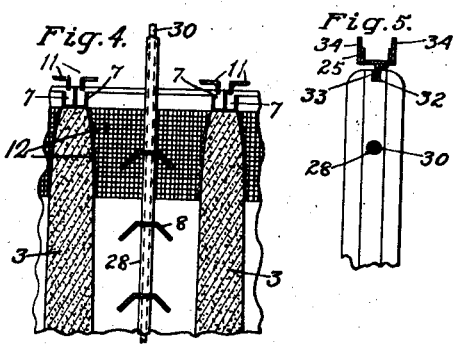
Fig. 4 is a partial section of the water distributing means at the upper ends of the treater flues.
Fig. 5 is a partial plan view of one of the discharge electrodes.

The operation of this form of my invention is similar to that of the form shown in Figs. 1 to 3, except that the water, solution or other liquid is distributed onto the inner faces of the wire screen distributing members 45, and by capillary action, tends to adhere to the surfaces of said screen members so that it runs down on such members and is thereby uniformly distributed on the upper ends of the flue walls 42. Similar screens 45' may be provided at the bottom of the receiving electrodes to conduct away the liquid without dripping.

Figs. 8 and 9 illustrate an embodiment of my invention in which the inclosing casing 68 is open at its upper end for discharge of the cleared gases into the atmosphere and is connected at its lower portion with a plurality of gas inlets 62 establishing communication from inlet conduit 63 to the respective chambers 61 in the casing, said chambers being separated by the receiving or collecting electrodes 60.

In order to avoid dripping or splashing of liquid from the receiving electrodes, which would be liable to lead to arcing across the space between the electrodes, I may, as shown in said Figs. 8 and 9, form the receiving electrodes 60 so that they extend down into the liquid in the lower part of the casing 68 below the gas inlets 62. The discharge electrodes are shown, in this case, as thin strips hung from insulated supports 69, the lower ends of said strips being rounded to prevent undue electrical strains.

While, for the sake of permanence of construction, I prefer to make the receiving electrodes of cement, plaster, masonry, unglazed tile or other inorganic rigid material, it may be preferred, in some cases, as shown in Fig. 9, to make the receiving electrodes of cloth or wire mesh, or other fabric presenting a porous absorbent surface, said fabric being mounted on suitable supporting frames, and extending over the perforated pipes 43' for supplying liquid thereto. Or, in some cases, the receiving electrodes may be of porous wood or like material.

In each of the above described forms of my invention, the collecting electrodes are preferably extended beyond the zone of discharge from the edges or plates of the discharge electrodes so as to avoid tendency to disruptive discharge or arcing over of current from the discharge electrodes to those parts of the receiving or collecting electrodes where the liquid is passing onto or off of the same.

In case the gases being treated are of such acid or corrosive nature that they will attack concrete or the mortar used in masonry, the flue walls or receiving electrodes may be formed of mortar, consisting, for example, of a mixture of sand and bituminous cement, or of sand and sulfur, suitably treated to provide a porous surface.

What I claim is:

1. In the art of precipitating suspended particles from gases by electrical action, the method of maintaining a clean electrode surface for receiving the precipitated material, which consists in distributing a liquid in a film, over a porous surface constituting a receiving electrode.

2. In the art of precipitating suspended particles from gases by electrical action, the method of maintaining a clean electrode surface for receiving the precipitated material, which consists in distributing liquid in a film over an absorbent surface, constituting a receiving electrode.

3. In the art of precipitating suspended particles from gases by electrical action, the method of maintaining a clean electrode surface to receive the precipitated material, which consists in distributing liquid, in a thin stream, over a porous surface.

4. In an apparatus for electrical precipitation of suspended material from gases, an electrode for receiving the precipitated material, having a porous surface, and means for distributing liquid onto said surface.

5. In an apparatus for electrical precipitation of suspended material from gases, an electrode for receiving the precipitated material, said electrode having a porous surface, a liquid-supply means, and distributing means for receiving liquid from said liquid supply means and distributing it on to said porous surface, said distributing means comprising a wire screen lying close to the upper part of said receiving electrode.

6. In an apparatus for electrical precipitation of suspended material from gases, an electrode for receiving the precipitated material, said electrode having a porous surface, a supply pipe for liquid, and a perforated distributing member adjacent to the upper portion of said electrode and adapted to receive liquid from said pipe and to distribute such liquid to said porous surface.

7. In an apparatus for separation of suspended material from gases by electrical action, a receiving electrode provided with means for supplying liquid thereto, and a discharge electrode opposing said receiving electrode and comprising a frame extending in a vertical plane, and strips mounted in said frame and extending horizontally in the direction of their length and having edge portions inclined downwardly and outwardly toward the opposing collecting electrode.

8. In an apparatus for separation of suspended material from gases by electrical action, a receiving electrode, and a discharge electrode opposing said receiving electrode, and comprising a frame extending in a vertical plane, and strips mounted in said frame and extending horizontally in the direction of their length and having edge portions inclined downwardly and outwardly toward the opposing collecting electrode.

In testimony whereof I have hereunto subscribed my name this 20th day of August, 1917.

WALTER AUGUST SCHMIDT.